United States Patent [19]

Dekkers et al.

[11] Patent Number: 5,171,778
[45] Date of Patent: Dec. 15, 1992

[54] MELT BLENDS OF POLYESTERS

[75] Inventors: Marinus E. J. Dekkers, Schenectady; Diana K. Yoshimura, Clifton Park; Michael P. Laughner, Schenectady, all of N.Y.

[73] Assignee: General Electric Company, Schenectady, N.Y.

[21] Appl. No.: 749,471

[22] Filed: Aug. 15, 1991

Related U.S. Application Data

[63] Continuation of Ser. No. 491,760, Mar. 12, 1990, abandoned.

[51] Int. Cl.$^5$ .................. C08L 67/02; C08L 67/04
[52] U.S. Cl. .................. 524/539; 524/504; 525/64; 525/65; 525/68; 525/438; 525/444
[58] Field of Search .................. 525/438, 444, 65; 524/539, 504

[56] References Cited

U.S. PATENT DOCUMENTS

| | | | |
|---|---|---|---|
| 4,141,882 | 2/1979 | Kodama | 523/435 |
| 4,459,390 | 7/1984 | Arai | 525/438 |
| 4,459,391 | 7/1984 | Arai | 525/438 |
| 4,459,392 | 7/1984 | Arai | 525/438 |
| 4,489,190 | 12/1984 | Froix . | |
| 4,728,698 | 3/1988 | Isayev | 525/439 |
| 4,758,636 | 7/1988 | Hijikata | 525/438 |
| 4,904,746 | 2/1990 | Brown et al. . | |
| 4,933,429 | 6/1990 | McCracken | 528/272 |

Primary Examiner—Patricia A. Short
Attorney, Agent, or Firm—William H. Pittman

[57] ABSTRACT

A composition prepared by blending liquid crystalline polyesters and linear polyesters under reactive conditions in the presence of at least one poly(O- or N- epoxy alkyl substituted) cyclic amide, imide, or imidate; wherein the blend exhibits an anisotropic melt phase. Articles made from the composition have increased strength stiffness and improved drip characteristics. A preferred embodiment includes a polyalkylene terephthalate, a liquid crystalline polyester with structural units including p-benzoic acid and naphthoic acid, and triglycidyl isocyanurate.

10 Claims, No Drawings

MELT BLENDS OF POLYESTERS

This application is a continuation of application Ser. No. 07/491,760, filed Mar. 12, 1990, now abandoned.

TECHNICAL FIELD

The present invention is directed to polyester compositions obtained by blending under reactive conditions linear polyesters and liquid crystalline polyesters.

BACKGROUND OF THE INVENTION

Polyester melt blended compositions are well known in the art. U.S. Pat. No. 4,489,190 discloses compositions of an isotropic polyester, such as polyalkylene terephthalate, and a wholly aromatic liquid crystalline polyester. The above mentioned blend can be molded to form shaped articles and possesses satisfactory mechanical properties such as strength and stiffness. However, the wholly aromatic liquid crystalline polyesters are generally dispersed in a droplet shape in a polyalkylene terephthalate matrix, thus creating a composition having less strength and less stiffness than can be achieved by a polyalkylene terephthalate matrix reinforced by liquid crystalline polyesters in the shape of fibers.

It is known in the art that linear polyester-polyepoxide compounds may be blended under reactive conditions (typically involving extrusion) with at least one other linear polyester, such as a polyalkylene terephthalate, to form branched polyesters with favorable melt viscosities. However, these blended compositions lack the strength and stiffness of a linear polyester reinforced by a fibrous liquid crystalline polyester.

The present invention provides a stronger and stiffer composition having a linear polyester liquid crystalline polyester composition which exhibits less dripping. The liquid crystalline polyesters are not droplet shaped but rather are fibrillated acting to reinforce the polyalkylene terephthalate matrix. The composition exhibits a high degree of anisotropy in the melt phase and may be further reinforced by fibers or mineral fillers.

SUMMARY OF THE INVENTION

In one of its aspects, the present invention is provided by blending poly (O- or N-epoxyalkyl-substituted) cyclic amide, imide or imidate with a linear polyester and a liquid crystalline polyester to form improved polymer compositions having an anisotropic melt phase, which are able to be molded to form articles having improved strength and stiffness and which exhibit improved drip characteristics when exposed to fire. In accordance with the present invention, there is provided a composition comprising a product obtained by blending under reactive conditions:

a. about 50% to about 95% by weight of a linear polyester matrix;

b. about 5% to about 50% by weight of a liquid crystalline polyester disposed within the matrix; and c. about 0.05% to about 25% by weight of at least one poly(O- or N-epoxy alkyl-substituted) cyclic amide, imide, or imidate; all percentage being based on total composition weight.

In accordance with the present invention, it has been found that there is increased fiber formation when poly-(O- or N-epoxy alkyl-substituted) cyclic amide, imide or imidate is used as a branching agent for linear polyesters, such as polyalkylene terephthalate, and liquid crystalline polyesters.

DETAILED DESCRIPTION OF THE INVENTION

The present invention provides a composition prepared by blending a linear polyester, at least one poly-(O- or N-epoxy alkyl-substituted) cyclic amide, imide, or imidate, and a thermotropic liquid crystalline polyester.

One group of linear polyesters useful in the composition of the present invention includes polyesters having structural units of formula I wherein:

I is

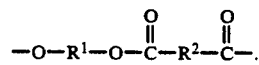

Each $R^1$ is independently a divalent aliphatic, alicyclic or aromatic radical containing about 2–10 carbon atoms and each $R^2$ is independently a divalent aliphatic, alicyclic or aromatic radical containing about 2–10 and usually about 6–10 carbon atoms. Polyesters containing such units may be prepared by the known reaction of dihydroxy compounds with dicarboxylic acids or functional derivatives thereof such as anhydrides, acid chlorides or lower alkyl (especially methyl) esters, preferably the esters.

The $R^1$ radicals may be one or more aliphatic or alicyclic hydrocarbon radicals containing about 2–10 carbon atoms, alicyclic radicals being known to those skilled in the art to be equivalent to aliphatic radicals for the purposes of the invention. They are most often derived from aliphatic or alicyclic dihydroxy compounds such as ethylene glycol, 1,4-butanediol, propylene glycol, 1,3-propanediol, 1,6-hexanediol, 1,10-decanediol, 1,4-cyclohexanedimethanol and 2-butene-1,4-diol. Aromatic dihydroxy compounds, especially bisphenols such as, 2,2-bis(4-hydroxyphenol)propane, bisphenol A, may also be employed. The $R^1$ radicals may also contain substituents which do not substantially alter the reactivity of the dihydroxy compound (e.g., alkoxy, halo, nitrile) or hetero atoms (e.g., oxygen or sulfur). The aliphatic or alicyclic $R^1$ radicals are usually saturated.

The $R^2$ radicals may be derived from such acids as succinic, adipic, maleic, isophthalic and terephthalic acids or similar substituted and hetero atom-containing acids.

Also contemplated are polymers in which at least a portion of the $R^1$ and/or $R^2$ values are soft segment radicals such as poly(oxyethylene) or poly(oxybutylene). Such polymers may be prepared by incorporating compounds such as polyethylene glycol, or dicarboxylic acids containing polyoxyalkylene segments in the polymerization reaction, and are typically elastomeric. Illustrative polyesters of this type are available from DuPont and General Electric under the trade name HYTREL and LOMOD, respectively.

Preferably, $R^1$ and $R^2$ are hydrocarbon radicals, typically containing about 2–10 and preferably 2–6 carbon atoms. Most often, $R^1$ is aliphatic and $R^2$ is aromatic. The polymer is most desirably a poly(alkylene terephthalate), particularly polybutylene terephthalate or polyethylene terephthalate, especially the former.

Suitable poly(O- or N-epoxyalkyl-substituted) cyclic amides, imides or imidates, employed as reactive branching agents according to the invention, usually contain one non-epoxy cyclic moiety although compounds with linked or fused moieties are also contemplated. It is most often a compound in which the epoxyalkyl group is bonded directly to the oxygen or nitrogen atom; however, compounds containing intervening structures, such as 2-carboglycidyloxyethyl compounds, may also be used. Three epoxy groups per molecule of poly(O- or N- epoxy alkyl-substituted) cyclic amide, imide, or imidate are most preferred, by reason of the ease of preparation therefrom of branched polyesters with a minimum of crosslinking.

Illustrative cyclic nuclei are the triazine, barbiturate, hydantoin, uracil, pyromellitic diimide, piperazinedione and parabanate ring systems. The epoxy-containing functionalities may be present as substituents on oxygen or nitrogen atoms therein, with nitrogen atoms frequently being preferred. The most suitable compounds are triazine derivatives including triglycidyl cyanurate and triglycidyl isocyanurate, hereinafter referred to as TGIC. TGIC is particularly preferred by reason of its availability and particular suitability for the formation of branched polyesters. It has the formula:

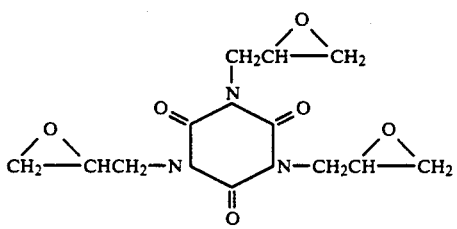

Liquid crystalline polymers, and more specifically thermotropic liquid crystalline polyesters, used as components in the compositions of the present invention should have the following common characteristics: a molecular shape having a large length to width ratio, a substantially large polarizability along rigid chain axis compared to that in the transverse direction, and finally parallel rigid molecular units prevailing in the structure. Therefore, the thermotropic liquid crystal polymer should have a rigid molecular structure similar to a combination of successive p-arylene groups, wherein each p-arylene group is an almost flat molecule (a large length-to-thickness ratio), and has a highly polarized electron cloud along the main chain. The result is that the aryl ring is symmetrical and rigid along the main axis, and the overall molecules fit quite well into a crystal lattice.

Preferably, the liquid crystalline polymers are those disclosed in U.S. Pat. No. 4,161,470 which is incorporated herein by reference. Such polymers have structural units of formulas II and III and mixtures thereof wherein:

II is

III is with the preferred liquid crystalline polyester having about 10 to 90 mole percent of structural unit II and about 10 to 90 mole percent of structural unit III. Another embodiment of the preferred liquid crystalline polyester has at least one of the hydrogen atoms present upon the aromatic rings of structural units II and III replaced by an alkyl group of 1 to 4 carbon atoms, an alkoxy group of 1 to 4 atoms, a halogen (i.e. Cl, Br, I) and mixtures thereof. The thermotropic liquid crystalline polymers used in the compositions of the present invention must exhibit an anisotropic melt phase as a result of an ordered configuration in the melt.

Scanning electron microscopy of compositions of the present invention shows that the thermotropic liquid crystalline polyesters are dispersed as fibers in a continuous polybutylene terephthalate (hereinafter PBT) matrix. In blends of PBT and wholly aromatic liquid crystalline polyesters as disclosed in the prior art, electron microscopy shows much less fibrillation (fiber formation) and a more particulate dispersion of the wholly aromatic liquid crystalline polyester within the matrix. It is believed that the improved stiffness and strength of the present invention can be understood from the differences in the morphology of the dispersed liquid crystalline polyester phase. A liquid crystalline polyester dispersed as a fiber in the PBT matrix acts as a much more effective reinforcing agent than liquid crystalline polyester dispersed as particles in a PBT matrix. Even though the composition of the present invention is mostly PBT, the composition exhibits an anisotropic melt phase due to the presence of the thermotropic liquid crystalline polyester therein, and also exhibits stiffness that approach those of pure liquid crystalline polyesters.

Although there is no intention of limiting the method of blending, the components of the composition of the present invention, may be made by first forming a reactive concentrate by reacting a portion of at least one linear polyester and TGIC and then melt blending the concentrate with the rest of the linear polyester and at least one thermotropic liquid crystalline polyester.

The composition of the present invention is useful as a molding resin, as well as, in the formation of fibers and films. Molded articles, fibers and films from the blend exhibit improved stiffness and strength over blends disclosed in the prior art. The composition of the present invention is capable of undergoing melt processing from about 250° C. to about 400° C., and preferably from about 275° C. to about 350° C.

Optionally up to 40% of other materials, substantially chemically inert, may be blended into the compositions of this invention, at any appropriate stage of blending. Such materials include fillers, reinforcing materials, flame retardants, pigments, dyes, stabilizers, anti-static agents, mold release agents and impact modifying polymers, the latter being exemplified by core-shell polymers having a core comprising alkyl acrylate, diene and/or styrene units and a shell comprising alkyl methacrylate units.

In order that those skilled in the art may be better able to practice the present invention, the following examples are given as illustrations of the superior strength, stiffness and drip characteristics of the present invention. It should be noted that the invention is not limited to the specific details embodied in the Examples.

EXAMPLE 1

Compositions were prepared by melt extrusion of polyalkylene terephthalate and a liquid crystalline polyester in the presence of TGIC. The polyalkylene terephthalate was PBT available from General Electric Company under the trade name VALOX. The liquid crystalline polyester (hereinafter sometimes "LCP"), exhibiting significant anisotropy in the melt at temperatures higher than 290° C., was available from Celanese Corporation under the trade name VECTRA. The TGIC used is a solid epoxy compound available from Ciba Geigy under the tradename ARALDITE. It has an epoxy content of 99 gram/equivalent.

The polymers were dried before compounding. PBT was dried for 4 hours at 125° C. The liquid crystalline polyester was dried for 4 hours at 150° C. The blend components were compounded on a twin screw extruder. The composition had about 80% by weight of PBT, about 20% by weight of liquid crystalline polyester, and about 0.4% by weight of TGIC. Other compositions (as shown in TABLE I below), were prepared by the above method for a comparative demonstration of the improved strength stiffness and drip characteristics of the present invention.

In order to measure the mechanical properties of the blends, they were injection molded into specimen for standard ASTM tensile test measurements. Tensile testing was done on an Instron 1350 tensile testing machine using ASTM D638III tensile specimens. Accurate strain measurements were obtained by using a strain gage clamped to the test specimen and executing the tensile test at a constant strain rate of $10^{-2}$/sec.

Table I shows the compositions in parts by weight, compounding and molding temperatures of the blends, as well as a comparison of the mechanical properties of the blends.

TABLE I

Mechanical Properties; Composition in Parts by Weight; and Blend Compounding and Molding Temperatures

|  | A* | B* | C* | I |
|---|---|---|---|---|
| PBT | 100 | 100 | 80 | 80 |
| LCP | — | — | 20 | 20 |
| TGIC | — | 0.4 | — | 0.4 |
| Tensile modulus (psi × $10^{-3}$) | 400 | 410 | 570 | 780 |
| Tensile strength break (psi × $10^{-3}$) | 6.1 | 6.7 | 10.5 | 10 |
| Elongation at break (%) | >15 | >15 | 3.3 | 2.0 |
| Visual Inspection of Fracture Surface | S** | S | S | F |
| Compounding Temperature (°C.) | — | 265 | 300 | 300 |
| Molding Temperature (°C) | 265 | 265 | 300 | 300 |

*A, B and C are included for comparison.
**S = Smooth; F = Fibrillated

The data for tensile properties listed in Table I illustrates the improved stiffness of the present invention.

A comparison of compositions B and C with composition I clearly illustrates that the addition of a small amount of TGIC to a PBT-LCP blend in a weight ratio of 80:20 respectively, leads to a significant improvement in the tensile modulus (i.e. stiffness).

The composition prepared from PBT, LCP and TGIC exhibits a surprising and unexpected improvement in UL flammability test as is shown in Table II.

TABLE II

Drip Characteristics and Blend Compositions in Parts by Weight

|  | A* | B* | C* | I |
|---|---|---|---|---|
| PBT | 100 | 100 | 80 | 80 |
| LCP | — | — | 20 | 20 |
| TGIC | — | 0.4 | — | 0.4 |
| Seconds until the first drip (1/16" bar thickness) | 1.3 | 2.2 | 1.4 | 9.1 |

*A, B, C are included for comparison.

The addition of TGIC to a PBT-LCP composition in the weight ratio of 80:20 increases the time from the first drip from 1.4 to 9.1 seconds. The blending of LCP with TGIC and PBT increases the time from the first drip from 2.2 to 9.1 seconds.

EXAMPLE II

Compositions were prepared from the materials and in the manner described in Example I. Glass fibers were added to the compositions as reinforcing resin fillers. Mechanical properties of these compositions were measured in the manner described in Example 1 and are illustrated in Table III.

TABLE III

Mechanical Properties, Blend Compositions in Parts by Weight, and Blend Compounding and Molding Temperatures

|  | E* | F* | II |
|---|---|---|---|
| PBT | 75 | 60 | 60 |
| LCP | — | 15 | 15 |
| TGIC | — | — | 0.3 |
| Glass fibers | 25 | 25 | 25 |
| Tensile modulus (psi × $10^{-3}$) | 1070 | 1420 | 1640 |
| Tensile strength at break (psi × $10^{-3}$) | 13.5 | 15.5 | 17.5 |
| Elongation at break (%) | 3.6 | 2.1 | 2.0 |
| Compounding Temperature (°C.) | 265 | 300 | 300 |
| Molding Temperature (°C.) | 265 | 300 | 300 |

*E and F are included for comparison.

A comparison of samples E, F, and II illustrates that while a glass fiber reinforced PBT-LCP composition does possess somewhat more stiffness and strength, a glass fiber reinforced PBT-LCP-TGIC composition exhibits significantly improved strength and stiffness characteristics.

What is claimed is:

1. A composition comprising a product obtained by blending under reactive conditions:
   a. about 50% to about 95% by weight, based on the composition weight, of a polyalkylene terephthlate matrix;
   b. about 5% to about 50% by weight of a fibrillated liquid crystalline polyester disposed within the matrix, wherein the liquid crystalline polyester comprises structural units of formulas II and III wherein
   II is

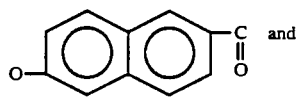

III is

and;

c. about 0.05% to about 25% by weight of triglycidyl isocyanurate.

2. A composition according to claim 1 wherein the blend is capable of undergoing melt processing at a temperature from about 250° C. to about 400° C.

3. A composition according to claim 2 wherein the temperature ranges from about 275° C. to about 350° C.

4. A composition according to claim 1 wherein the polyalkylene terephthalate is polybutylene terephthalate.

5. A composition according to claim 1 wherein the liquid crystalline polyester exhibits an anisotropic melt phase at a temperature up to about 375° C.

6. A composition according to claim 1 wherein the liquid crystalline polyester comprises about 10 mole percent to about 90 mole percent of structural unit II and about 10 mole percent to about 90 mole percent of structural unit III.

7. A composition according to claim 1 further comprising up to about 40% by weight of at least one constituent selected from the group consisting of flame retardants, impact modifiers, reinforcing agents, and mixtures thereof.

8. A composition according to claim 7 wherein the reinforcing agents comprise glass fibers.

9. A molded article, fiber, or film comprising the composition of claim 7.

10. A molded article, fiber, or film comprising the composition of claim 1.

* * * * *